(12) United States Patent
Nguyen et al.

(10) Patent No.: US 7,763,556 B2
(45) Date of Patent: Jul. 27, 2010

(54) HURRICANE RESISTANT COMPOSITES

(75) Inventors: Huy X. Nguyen, Midlothian, VA (US); John E. Holland, Bailey, NC (US); Connie W. Holland, Bailey, NC (US)

(73) Assignee: Honeywell International Inc., Morristown, NJ (US)

( * ) Notice: Subject to any disclaimer, the term of this patent is extended or adjusted under 35 U.S.C. 154(b) by 769 days.

(21) Appl. No.: 11/657,302

(22) Filed: Jan. 24, 2007

(65) Prior Publication Data

US 2008/0176051 A1    Jul. 24, 2008

(51) Int. Cl.
*B32B 27/12* (2006.01)
*E04B 1/00* (2006.01)
*E04B 5/00* (2006.01)
*E04F 10/06* (2006.01)

(52) U.S. Cl. ............... 442/286; 442/239; 442/268; 442/301; 428/34; 52/273; 52/741.3; 160/66; 160/368.1

(58) Field of Classification Search ........... 442/286, 442/290, 394, 397, 398; 428/34; 160/66, 160/368.1; 52/273, 741.3
See application file for complete search history.

(56) References Cited

U.S. PATENT DOCUMENTS

| | | | |
|---|---|---|---|
| 4,137,394 A | 1/1979 | Meihuizen et al. | 528/100 |
| 4,356,138 A | 10/1982 | Kavesh et al. | 264/164 |
| 4,413,110 A | 11/1983 | Kavesh et al. | 526/348.1 |
| 4,457,985 A | 7/1984 | Harpell et al. | 428/224 |
| 4,815,562 A | 3/1989 | Denny et al. | 182/138 |
| 5,702,657 A | 12/1997 | Yoshida et al. | 264/112 |
| 5,822,943 A | 10/1998 | Frankoski et al. | 52/518 |
| 5,914,175 A | 6/1999 | Nudo et al. | 428/178 |
| 6,057,029 A | 5/2000 | Demestre et al. | 428/221 |
| 6,119,422 A | 9/2000 | Clear et al. | 52/309.8 |
| 6,125,905 A * | 10/2000 | Woodside et al. | 160/67 |
| 6,176,050 B1 | 1/2001 | Gower | 52/222 |
| 6,263,949 B1 | 7/2001 | Guthrie, Jr. | 160/380 |
| 6,280,546 B1 | 8/2001 | Holland et al. | 156/85 |
| 6,286,579 B1 | 9/2001 | Gottschalk | 160/264 |
| 6,296,039 B1 | 10/2001 | Mullet et al. | 160/267.1 |
| 6,325,085 B1 | 12/2001 | Gower | 135/ 90 |
| 6,341,455 B1 | 1/2002 | Gunn | 52/202 |
| 6,412,540 B2 | 7/2002 | Hendee | 160/327 |
| 6,481,166 B2 | 11/2002 | Shelton | 52/167.1 |
| 6,536,176 B1 | 3/2003 | Nordgren et al. | 52/506.01 |
| 6,615,555 B2 | 9/2003 | Madden | 52/202 |
| 6,705,054 B2 | 3/2004 | Pelton | 52/203 |
| 6,818,091 B1 | 11/2004 | Holland et al. | 156/309.6 |
| 6,851,464 B2 | 2/2005 | Hudoba et al. | 160/31 |
| 6,865,852 B2 | 3/2005 | Gower | 52/222 |
| 6,886,299 B2 | 5/2005 | Gower | 52/222 |
| 6,886,300 B2 | 5/2005 | Hudoba et al. | 52/222 |
| 6,959,748 B2 | 11/2005 | Hudoba | 160/31 |
| 7,082,733 B2 | 8/2006 | Nordgren et al. | 52/506.01 |
| 7,622,406 B2 | 11/2009 | Holland et al. | 442/286 |
| 2001/0039777 A1 | 11/2001 | Karalic | 52/407.01 |
| 2003/0079430 A1 | 5/2003 | Hanks | 52/506.01 |
| 2003/0159372 A1 | 8/2003 | Motro | 52/202 |
| 2003/0159373 A1 | 8/2003 | Lien | 52/202 |
| 2004/0010988 A1 | 1/2004 | Jaycox et al. | 52/202 |
| 2004/0154242 A1 | 8/2004 | Hudoba et al. | 52/202 |
| 2004/0221534 A1 | 11/2004 | Hanks | 52/506.01 |
| 2005/0138891 A1 | 6/2005 | Wood et al. | 52/782.1 |
| 2005/0144900 A1 | 7/2005 | Hallissy et al. | 52/782.1 |
| 2005/0279465 A1 | 12/2005 | Gower | 160/368.1 |
| 2006/0019062 A1 | 1/2006 | Hanks et al. | 428/116 |
| 2006/0070347 A1 | 4/2006 | Gupta et al. | 52/784.1 |
| 2006/0101758 A1 | 5/2006 | Egan | 52/408 |
| 2006/0150554 A1 | 7/2006 | Hanks | |
| 2006/0151132 A1 | 7/2006 | Scalfani et al. | |

FOREIGN PATENT DOCUMENTS

| | | |
|---|---|---|
| DE | 20221063 | 12/2004 |
| WO | WO2004108410 | 12/2004 |
| WO | WO2007000646 | 1/2007 |

* cited by examiner

*Primary Examiner*—Norca L Torres-Velazquez
(74) *Attorney, Agent, or Firm*—Erika S. Wilson

(57) ABSTRACT

A composite flexible fabric is employed as a covering for an opening of a building, such as a window or door. The composite fabric protects the opening from hurricane force winds and associated flying objects. The composite fabric is formed from at least one layer of a fabric comprised of high tenacity polyolefin fibers and at least one layer of a plastic film. The film is attached to at least one surface of the high tenacity polyolefin fiber fabric. Each of the fabric layer and the film layer are sufficient translucent so as to permit light to enter the opening of the building. The fabric layer provides protection against high wind and impact from projectiles, and the film layer provides an impervious barrier to water, such as wind driven rain. An adhesive layer may be used to enhance bonding between the fabric layer and the film layer.

33 Claims, No Drawings

HURRICANE RESISTANT COMPOSITES

BACKGROUND OF THE INVENTION

1. Field of the Invention

This invention relates to a barrier material to protect property against damage caused by high winds and impact from associated flying objects that result from a hurricane or similar occurrence.

2. Description of the Related Art

Various devices and materials have been proposed, some of which are currently utilized, for the protection of building openings (such as windows, doors and sliding glass doors) from the effects of high winds and flying objects associated with a hurricane or similar event. In the simplest form, sheets of plywood have been used which are nailed or screwed to a building as a covering for windows and doors. The user needs to cut plywood sheets to the proper opening dimensions and install them. Due to their bulkiness and weight, plywood structures are typically installed only when a hurricane or similar incident is imminent. During the hurricane, etc., the plywood entirely shuts out any light from entering into the building. Since electricity frequently is interrupted during hurricanes, the covered windows and doors enhance a cave-like effect that is uncomfortable to the building occupants. The plywood sheets need removed by hand after the threat of damage has passed. The securing system (nails, etc.) may cause damage to the building structure.

Another opening protective system that has been utilized for some time is a plurality of corrugated steel, aluminum or other metal panels. These panels usually have holes provided at several locations along their periphery and are adapted to be positioned on screws that have been secured to the building around the opening to be protected. Wing nuts are typically used to secure the metal panels to the screws, and the panels are held in place by a combination of the screw-wing nut assembly and rails that at least partially surround the window or door. Like plywood, these panels are usually very heavy. They also need to be installed before a hurricane event and removed afterwards. Also like the plywood system, these metal panels or "shutters" block out almost all of the outside like when they are installed in place. In addition, they must be stored in a place which permits the panels to be readily obtained when needed. Thus the metal shutters provide an inconvenient although effective protection against the effects of a hurricane.

One system that has been used to provide light into a building while providing protection against hurricanes are heavy plastic corrugated sheets, such as those formed of polycarbonate. These sheets are typically installed in a manner similar to the metal panels. They are heavy and cumbersome to install, and also require significant storage space. Combinations of metal and plastic panels have also been suggested in U.S. Pat. No. 6,615,555.

Another type of protective device is a flexible metal shutter that is formed from interconnected metal slats. These shutters may be manually or electrically operated and are permanent attachments to the building. They are adapted to be rolled up or open laterally in an accordion-like manner. Although these structures offer acceptable protection, they likewise permit very little light to penetrate when they are in their protective position. These systems also tend to be the most expensive.

Still another protective system is a coated fabric made from a plastic coated polyester material. The coated fabric is typically substantially thick to provide the necessary protection against wind and flying object damage. The fabric is provided with grommets along its periphery. The fabric is secured to the building usually using screws that are attached to the building and wing nut fasteners. These fabrics are heavy and difficult to install, and are relatively bulky to store. They also do not let sufficient light to penetrate when they are installed.

Other fabric protective systems are disclosed, for example, in U.S. Pat. Nos. 6,176,050, 6,263,949, 6,851,464 and 6,886,300, as well as in the following U.S. patent application publications: 2003/0079430, 2004/0154242 and 2004/0221534, the disclosures of which are expressly incorporated herein by reference to the extent not inconsistent herewith.

However, a need still exists to provide a better system than heretofore proposed. It would be desirable to provide a barrier device for protecting buildings which is lightweight, permits entry of light and also provides the requisite protection against high winds and associated flying objects.

SUMMARY OF THE INVENTION

In accordance with this invention, there is provided a building having at least one opening, the opening being protected from hurricane force winds and associated flying objects by a flexible composite fabric covering the opening, the flexible composite fabric comprising:

(a) at least one layer of a fabric comprising high tenacity polyolefin fibers; and (b) at least one layer of a plastic film attached to a surface of the high tenacity polyolefin fiber fabric;

each of the fabric layer and the film layer having sufficient translucency so as to permit light to enter the opening of the building; the fabric layer providing protection against high wind and impact from projectiles, and the film layer providing an impervious barrier to water, whereby the opening is protected against hurricane force winds and associated flying objects.

Also in accordance with this invention, there is provided in a building having an opening, and a protective screening covering the opening, the improvement comprising the screening comprising a flexible composite fabric comprising:

(a) at least one layer of a fabric comprising high tenacity polyolefin fibers; and (b) at least one layer of a plastic film attached to a surface of the high tenacity polyolefin fiber fabric;

each of the fabric layer and the film layer having sufficient translucency so as to permit light to enter said opening of the building; the fabric layer providing protection against high wind and impact from projectiles, and the film layer providing an impervious barrier to water, whereby the opening is protected against hurricane force winds and associated flying objects.

Further in accordance with this invention, there is provided a method of protecting a building opening from hurricane force winds and associated flying objects, the method comprising providing a screening for the building opening, the screening comprising a flexible composite fabric covering the opening, the flexible composite fabric comprising:

(a) at least one layer of a fabric comprising high tenacity polyolefin fibers; and (b) at least one layer of a plastic film attached to a surface of the high tenacity polyolefin fiber fabric;

each of the fabric layer and the film layer having sufficient translucency so as to permit light to enter the opening of the building; the fabric layer providing protection against high wind and impact from projectiles, and the film layer providing an impervious barrier to water.

In still further accordance with this invention, there is provided a lightweight storm curtain for covering at least one opening in a building structure, such as windows, doors, sliding glass doors and the like, and for protecting the opening from hurricane force winds and associated flying objects, the storm curtain comprising:

(a) a flexible composite fabric comprising:
  (i) at least one base layer of a fabric having first and second surfaces, the fabric formed of yarns comprising extended chain polyethylene fibers, the yarns having a denier in the range from about 50 to about 5000;
  (ii) at least one waterproofing layer of a substantially clear plastic film, the plastic film having first and second surfaces;
  (iii) at least one adhesive layer bonding one of the surfaces of said base layer to one of the surfaces of the plastic film;
  (iv) the total weight of the composite fabric being in the range of from about 2 to about 30 oz/yd$^2$ (67.8 to 1017 g/in$^2$), and the total thickness of the composite fabric being in the range of from about 6 to about 60 mils (150 to 1500 µm); and
(b) a retainer releaseably connecting the composite fabric to the building structure in such a manner as to cover the opening;
the composite fabric layer having sufficient translucency so as to permit at least about 60% of light to enter the opening of the building structure, providing protection against high wind and impact from projectiles, and providing a barrier to water.

In further accordance with this invention, there is provided a lightweight storm curtain for covering at least one opening in a building structure, such as windows, doors, sliding glass doors and the like, and for protecting the opening from hurricane force winds and associated flying objects, the storm curtain comprising:

(a) a flexible composite fabric comprising:
  (i) a base layer of a woven fabric having first and second surfaces, the woven fabric formed of yarns comprising extended chain polyethylene fibers, the yarns having a denier in the range from about 650 to about 3000;
  (ii) a waterproofing layer of a substantially clear polyethylene film, the polyethylene film having first and second surfaces;
  (iii) an ethylene vinyl acetate adhesive layer bonding one of the surfaces of said base layer to one of the surfaces of the polyethylene film;
  (iv) the total weight of the composite fabric being in the range of from about 2 to about 30 oz/yd$^2$ (67.8 to 1017 g/m$^2$), and the total thickness of the composite fabric being in the range of from about 6 to about 60 mils (150 to 1500 µm); and
(b) a retainer releaseably connecting the composite fabric to the building structure in such a manner as to cover the opening;
the composite fabric layer having sufficient translucency so as to permit at least about 75% of light to enter the opening of the building structure, providing protection against high wind and impact from projectiles, and providing a barrier to water.

The invention thus provides a protective barrier system which is lightweight and thus easier to install and less bulky to store. The composite structure has sufficient strength to provide the requisite protection against hurricane force winds, but also permits a significant amount of light to penetrate. As such, there is less of an urgency to immediately remove them from windows, doors and sliding glass doors, and the like, after a hurricane has passed. The structure is flexible and can be in roll form or sheet form. The structure is also resistant to water that may be impacted against it by high winds. The structure may also include a bonding layer which bonds the fabric layer to the film layer.

DETAILED DESCRIPTION OF THE INVENTION

The hurricane resistant composite structures of this invention include at least one layer of a high strength polyolefin fabric and at least one plastic film that is attached thereto. If desired to enhance the adhesion between the high strength polyolefin fabric and the plastic film, an adhesive or bonding layer may be employed.

The high strength polyolefin fabric layer(s) is formed from high tenacity polyolefin fibers, preferably high tenacity polyethylene fibers and/or high tenacity polypropylene fibers. For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 15 g/d, even more preferably equal to or greater than about 20 g/d, and most preferably equal to or greater than about 25 g/d.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

The yarns may be of any suitable denier, such as, for example, about 50 to about 5000 denier, more preferably from about 200 to about 5000 denier, still more preferably from about 650 to about 3000 denier, and most preferably from about 800 to about 1500 denier.

The fabric of this invention may be in the form of woven, knitted or non-woven fabrics formed from the high tenacity polyolefin fibers, most preferably high tenacity extended chain polyethylene fibers. Preferably, at least about 50% by weight of the fibers in the fabric are such high tenacity fibers, more preferably at least about 75% by weight of the fibers in the fabric are such high tenacity fibers, and most preferably all of the fibers in the fabric are such high tenacity fibers. Most preferred are fabrics in which all of the fibers are high tenacity polyolefin fibers. The remaining fibers in the fabric construction may be any suitable other high tenacity synthetic fiber (e.g., aramid, polyvinyl alcohol, polybenzazole, polyacrylonitrile, liquid crystal copolyester, rigid rod fiber, and the like, as well as blends of one or more of the foregoing) or other thermoplastic fiber, such as polyester or nylon fibers. Alternatively, non-thermoplastic fibers may be used in the fabric together with the high tenacity polyolefin fibers. Examples of such other fibers include metal fibers, ceramic fibers, glass fibers, graphite fibers and the like.

The yarns may be in essentially parallel alignment (unidirectionally aligned), or the yarns may be twisted, overwrapped or entangled. The fabrics of the invention may be woven with yarns having different fibers in the warp and weft directions, or in other directions.

The high strength fibers useful in the fabrics used in this invention are high tenacity polyolefin fibers, including high tenacity polyethylene fibers and/or high tenacity polypropylene fibers. The high tenacity polyethylene fibers are extended chain polyethylene fibers, which are also referred to as highly oriented high molecular weight polyethylene fibers.

U.S. Pat. No. 4,457,985 generally discusses such high molecular weight polyethylene fibers and polypropylene fibers, and the disclosure of this patent is hereby incorporated by reference to the extent that it is not inconsistent herewith. In the case of polyethylene fibers, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers are commercially available and are sold under the trademark SPECTRA® by Honeywell International Inc. of Morristown, N.J., U.S.A. Polyethylene fibers from other sources may also be used.

Depending upon the formation technique, the draw ratio and temperatures, and other conditions, a variety of properties can be imparted to these fibers. The tenacity of the polyethylene fibers is at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

As mentioned above, the high strength fibers may be in the form of a woven, knitted or non-woven fabric. One preferred material is a woven fabric formed from SPECTRA® extended chain polyethylene fibers.

In one embodiment, the fabric preferably has between about 15 and about 55 ends per inch (about 5.9 to about 21.6 ends per cm) in both the warp and fill directions, and more preferably between about 17 and about 45 ends per inch (about 6.7 to about 17.7 ends per cm). The yarns preferably have a denier of from about 375 to about 1300. The result is a woven fabric weighing preferably between about 5 and about 12 ounces per square yard (about 169.5 to about 406.8 g/m$^2$), and more preferably between about 5 and about 11 ounces per square yard (about 169.5 to about 373.0 g/m$^2$). Examples of such fabrics are those designated as SPECTRA® fabric styles 902, 904, 952, 955 and 960. Other examples included fabrics formed from basket weaves, such as SPECTRA® fabric style 912. As those skilled in the art will appreciate, the fabric constructions described here are exemplary only and not intended to limit the invention thereto. Each of these uncoated fabrics is available from Hexcel of Anderson, S.C., and is made from SPECTRA® fiber:

| Style | Weave | Weight (Oz/Yd$^2$) | Thickness (Inches) | Counts (Ends/Inch) | Yarn Denier (Warp/Fill) |
|---|---|---|---|---|---|
| 902 | Plain | 5.5 | 0.018 | 17 × 17 | 1200/1200 |
| 904 | Plain | 6.0 | 0.017 | 34 × 34 | 650/650 |
| 952 | Plain | 6.0 | 0.017 | 34 × 34 | 650/650 |
| 912 | Basket | 11.3 | 0.028 | 34 × 34 | 1200/1200 |

As shown in the table, a plain weave fabric having 17 ends per inch of 1200 denier SPECTRA® 900 fiber in both the warp and fill directions weighs only about 5.5 ounces per square yard (about 186.5 g/m$^2$), but has a breaking strength of greater than 800 pounds force per inch (1401 N/cm) in both directions. Other weaves than a plain weave may be employed, such as a basket weave as indicated.

If a woven fabric is employed, it may be of any weave pattern, including plain weave, basket weave, twill, satin, three dimensional woven fabrics, and any of their several variations. Plain and basket weave fabrics are preferred and more preferred are such fabrics having an equal warp and weft count. The woven fabric preferably does not include a resin matrix, but one may be employed if desired, as discussed below with respect to the non-woven fabrics. Such resin matrix should be sufficiently translucent so as to not detract from the light transmitting nature of the composite material. If a resin matrix is employed with a woven fabric, the fabric may be surface coated or fully impregnated with a suitable resin matrix. For example, the woven fabric may be spray coated with the resin matrix or dipped into a container containing the resin matrix, after which the water or solvent is driven off.

The fabrics used in the composite structure are relatively thin yet very strong. The preferred thickness of the fabrics are from about 0.005 to about 0.036 inches (127 to 911 µm), more preferably from about 0.011 to about 0.028 inches (279 to 711 µm), and most preferably from about 0.015 to about 0.023 inch (381 to 584 µm) The thinness and the translucency of the fibers allow a substantial amount of light to penetrate. The fabrics also have low stretch characteristics (typically an elongation of 5% or less) and thus are effective as outside screens for windows or doors. The polyolefin fabrics are not adversely affected by water, so that they are not degraded by wind driven water.

Besides the preferred woven fabrics, other types of high tenacity polyolefin fabrics that may be employed in this invention include knitted fabrics and non-woven fabrics, such as plies of unidirectionally oriented fibers, or fibers which are felted in a random orientation. Such felted fabrics may be compressed to a desired thickness. Typically, the non-woven fabrics are embedded in a suitable resin matrix, as is known in the art. Fabrics formed from unidirectionally oriented fibers typically have one layer of fibers which extend in one direction and a second layer of fibers which extend in a direction 90° from the first fibers. Where the individual plies are unidirectionally oriented fibers, the successive plies are preferably rotated relative to one another, for example at angles of 0°/90° or 0°/45°/90°/45°/0° or at other angles.

If a resin matrix is employed, it may be formed from a wide variety of thermoplastic, and preferably elastomeric, materials having desired characteristics as is known in the art. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

The proportion of the resin matrix material to fiber in the fabric matrix preferably forms about 1 to about 98 percent by weight, more preferably from about 5 to about 95 percent by weight, and most preferably from about 5 to about 40 percent by weight, of the total weight of the fabric matrix.

A wide variety of thermoplastic materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene.

One preferred group of materials for high tenacity polyolefin fiber fabrics, in particular high tenacity extended chain polyethylene fiber fabrics, are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer. Preferably the resin matrix is a flexible thermoplastic material. A preferred resin matrix is an isoprene-styrene-isoprene block copolymer, such as Kraton® D1107 isoprene-styrene-isoprene block copolymer available from Kraton Polymer LLC.

In general, non-woven fabric useful herein are preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. The non-woven fabric may be constructed via a variety of methods. In the preferred case of a unidirectionally aligned fabric, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The high tenacity fabrics may be coated with the chosen matrix resin by applying the matrix composition to the fibers and then consolidating the matrix composition/high tenacity fibers in a known manner. By "consolidating" is meant that the matrix material and the fiber network layer are combined into a single unitary layer. Consolidation can occur via drying, cooling, heating, pressure or a combination thereof. In the case of unidirectional non-woven fabrics, for example, one known technique is to pass the fibers from a creel and through a combing station to form a unidirectional fiber network. The fiber network is then placed on a carrier web and the matrix resin is coated thereon, such as by spraying or dipping using a roll coater or the like. The coated fiber (unitape) is then passed through an oven to evaporate the water or strip off the solvent from the composition and is wound up on a roller. The carrier web may be stripped from the fabric upon rolling or may be stripped when the fabric is used.

As mentioned above, the fabric may also be in the form of a knitted fabric. Knit structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through. As with the woven fabrics, the knitted fabrics may include a resin matrix.

As mentioned above, the fabric is chosen so as to have a desired degree of translucency. Preferably, the fabric transmits at least about 60 percent, more preferably at least about 65 percent, and most preferably at least about 75 percent, of light. Stated another way, preferably, the fabric transmits from about 60 to about 90 percent of light, more preferably from about 65 to about 85 percent of light, and most preferably from about 75 to about 85 percent of light. Light transmission can be determined, for example, based on the procedure of ASTM D 1746.

Attached to at least one surface of the high strength polyolefin fabric is at least one thin plastic film. Preferably, there are plastic films attached to both surfaces of the fabric. Such films typically have a thickness of from about 0.1 to about 10 mils (2.5 to 25 μm), more preferably from about 0.2 to about 2 mils (5 to 50 μm), and most preferably from about 0.5 to about 1.5 mils (12.5 to 37.5 μm). The plastic film may be formed from polyolefins such as polyethylene (including low density polyethylene, linear low density polyethylene and ultrahigh molecular weight polyethylene), polypropylene and the like, fluoropolymers such as polytetrafluoroethylene, polychlorotrifluoroethylene homopolymers and copolymers and the like, as well as polyesters, nylons, polycarbonates, and the like. Most preferably the film is a low density polyethylene film. The polymeric film should be resistant to water in order to provide enhanced water resistance to the fabric. Preferably, the plastic film(s) is substantially clear to maximize the amount of light that passes through. However, colored films may be used if less light transmission is desired.

The composite fabric may be formed from multiple layers of fabric layers and film layers, preferably in an alternating manner. The plastic film layer may be adhered to one or both surfaces of the fabric layer in any suitable manner, such as by heating and/or pressure, coating (including extrusion coating), use of an adhesive, or the like. Suitable techniques are described, for example, in U.S. Pat. No. 6,280,546, the disclosure of which is expressly incorporated herein by reference to the extent it is not inconsistent herewith.

Preferably, an adhesive or bonding layer is employed between the high tenacity polyolefin fabric layer(s) and the plastic film layer(s). Preferably the bonding layer is a thermoplastic material, but thermosetting materials such as flexible epoxies or high elongation polyurethanes, as well as pressure sensitive adhesives, can also be employed. The bonding layers may be in resin form or cast film form. Preferred thermoplastic bonding materials for the bonding layer are films of olefin polymers or copolymers having a melting point or melting point range less than about 140° C., particularly ethylene polymers and copolymers (e.g., ethylene/propylene copolymers). Melting point is determined, for example, by differential scanning calorimetry (DSC) at a heating rate of 10° C. per minute. The most preferred bonding materials are low density polyethylene (LDPE), ethylene vinyl acetate (EVA) and LDPE/EVA copolymers. The bonding layer can be applied in any suitable form, although a film is particularly preferred. The film can be used to coat and bond to the high performance fabric base described hereinabove, while creating the intermediate bonding layer. EVA bonds particularly well to fabric woven from yarns containing high-strength, high molecular weight polyethylene fibers. The EVA layer acts as a highly satisfactory intermediate bonding layer that has a bonding affinity for both the polyethylene fabric base layer and the film layer.

The composite structure of this invention also has a desired amount of translucency. The amount of light transmitted through the composite structure is preferably the same amount as mentioned with respect to the fabric. That is, preferably the composite fabric transmits at least about 60 percent, more preferably at least about 65 percent, and most preferably at least about 75 percent, of light. Stated another way, the composite fabric transmits from about 60 to about 90 percent of light, more preferably from about 65 to about 85 percent of light, and most preferably from about 75 to about 85 percent of light. Again, light transmission can be determined, for example, based on the procedure of ASTM D 1746.

The composite fabric of this invention is flexible and can be rolled up when not in its protective position covering an opening in a building. The fabric may be used in a manual or electric shutter system and serve to act as a storm curtain. Also, the fabric can be releaseably connected to the building structure in a position covering an opening by a retainer. The word "retainer" as used herein refers to a frame, restraint, assembly, guide, roller, or one or more fasteners, such as grommets which receive a screw and wing nut type fastening, or any other suitable fastening device. In one embodiment, the fabric can be mounted on a suitable roller and rolled down into its protective position around a door or window in a building. Suitable provision should be made to secure the bottom and possibly the edge portions of the storm curtain in place. Typical means include the use of metal supporting channels or grommets on the bottom and/or edges of the curtain through which a suitable tie down device may be placed. In another embodiment, the composite fabric may be used in sheet form (which is foldable for storage) and include grommets along a portion or all of its periphery, with the grommets being adapted to receive a screw and wing nut type fastener or any other suitable fastening device.

Preferably, the composite fabric of the invention has a combined thickness of from about 6 to about 60 mils (150 to 1500 μm), more preferably from about 10 to about 50 mils (250 to 1250 μm), and most preferably from about 25 to about 50 mils (625 to 1250 μm). In addition, the composite fabric preferably has a weight of from about 2 to about 30 oz/yd$^2$ (67.8 to 1017 g/m$^2$), more preferably from about 5 to about 25 oz/yd$^2$ (169.5 to 847.5 g/m$^2$), and most preferably from about 10 to about 22 oz/yd (339 to 745.8 g/m$^2$).

Due to their light weight, the composite fabrics of this invention are easy to wind up if in roll form and are easy to manually maneuver for installation/removal if in sheet form. As is known in the art and in conformance with various building standards, the composite fabric is placed a predetermined distance from a window or door to be protected. The composite fabrics can be designed to limit the amount of deflection from impacting objects so as to be in conformance with various storm building codes.

Because they are formed from high tenacity polyolefin fibers, the composite fabrics of this invention are lightweight, strong, impact resistant, and inert to water. They provide excellent protection as a storm curtain or the like for a building to protect various openings in a building, including doors and windows. The thinness and translucency of the composite fabric permits more light to penetrate. The low stretch characteristic of the polyolefin fibers makes the resultant fabric an effective outside protective screen for building openings.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percents are by weight, unless otherwise stated.

EXAMPLES

Example 1

A flexible composite fabric was formed from a single ply fabric made of extended chain polyethylene fibers. The fibers were Spectra® 900, 650 denier yarn available from Honeywell International Inc. and had a tenacity of 30.5 g/d. The fabric was in the form of a plain weave woven fabric (style 904 made by Hexcel Reinforcements Corp.), characterized as having a weight of 6.3 oz/yd$^2$ (0.02 g/cm$^2$), 34×34 ends per inch (13.4×13.4 ends per cm), a yarn denier of 650 in both the warp and weft, and a thickness of 17 mils (425 μm). The fabric was laminated on both sides to a low density polyethylene film having a thickness of 1.5 mil (37.5 μm). A 4 mil (100 μm) film of ethylene vinyl acetate was used as a bonding layer between the fabric layer and the two polyethylene film layers. The layers were laminated together by a thermal lamination technique as described in U.S. Pat. Nos. 6,280,546 and 6,818,091.

The total composite fabric weight was 14.8 oz/yd$^2$ (0.05 g/cm$^2$), and the total composite fabric thickness was 0.030 inch (0.76 mm). The composite had a grab strength in the range of 850 to 950 pounds per inch (148.8 kN/m) of fabric width, as measured by ASTM 1682.

A 58 inch wide by 67 inch high (147.3×170.2 cm) composite fabric was tested as a hurricane curtain according to ASTM E1886/1996 (equivalent to the State of Florida Building Code Testing Application Standard TAS 201). These standards involve shooting a "large missile" (#2 Southern Pine stud, 2"×4"×96" (5.1 cm×10.2 cm×243.8 cm) in dimensions, 9 lbs (4.1 kg) in weight) at 50 ft/s (15.24 m/s) perpendicularly at the fabric. The composite curtain was mounted onto a wooden frame using metal grommets located around its edges. Two impacts were made—one at the exact center of the composite curtain and the other at a corner, about 7 inches (17.8 cm) from the edges of the same curtain. The composite curtain passed both impacts without tear or crack in the fabric. The same curtain (after 2 impacts) also passed a cyclic wind load test of ±60 pounds per square foot (2.87 kPa) (equivalent to a hurricane wind speed of 153 miles (244.8 kilometers) per hour) according to ASTM E1886/1996 (TAS 203).

The composite curtain was also subjected to the Taber abrasion test (ASTM D3389) and found to last over 106,000 cycles.

The percent transmitted light through this composite was found to be about 80% (test method based on ASTM D11746).

Example 2

A 60 inch wide by 60 inch high (152.4×152.4 cm) composite fabric similar to the structure of Example 1 was tested as a hurricane curtain according to ASTM E1886/1996 (also State of Florida Building Code Testing Application Standard TAS 201), as in Example 1. The composite shutter had grommets located at the top edge for mounting on a wooden frame. The bottom edge of the shutter was attached to the frame by a manual roll-up/roll-down mechanism. Two impacts were made—one at the exact center of the composite curtain and the other at a corner, about 7 to 8 inches (17.8 to 20.3 cm) from the edges of the same curtain. The composite curtain passed both impacts without tear or crack in the fabric. The deflection due to impact was found to be less than 8.5 inches (21.6 cm). The same curtain (after 2 impacts) also passed a cyclic wind load test of ±80 pounds per square foot (3.83 kPa) (equivalent to a hurricane wind speed of 177 miles (283.2 kilometers) per hour) according to ASTM E1886/1996 (TAS 203).

The composite curtain was also subject to the Static Air Pressure Test (ASTM E330 and TAS 202) and found to have a deflection of less than 8.2 inches (20.8 cm) at 120 pound per square foot (5.75 kPa) wind pressure.

Example 3

A flexible composite fabric was formed from a single ply fabric made of extended chain polyethylene fibers. The fibers were Spectra® 900, 1200 denier yarn available from Honeywell International Inc. and had a tenacity of 30 g/d. The fabric was in the form of a basket weave woven fabric (style 912 made by Hexcel Reinforcements Corp.), characterized as having a weight of 11.3 oz/yd$^2$ (0.044 g/cm$^2$), 34×34 ends per inch (13.4×13.4 ends per cm), a yarn denier of 1200 in both the warp and weft, and a thickness of 28 mils (700 μm). The fabric was laminated on both sides to a low density polyethylene film having a thickness of about 2 mils (10 μm). A 7-8 mil (175-200 μm) film of ethylene vinyl acetate was used as a bonding layer between the fabric and the two polyethylene film layers. The layers were laminated together by a thermal lamination technique as described in U.S. Pat. Nos. 6,280,546 and 6,818,091.

The total composite fabric weight was 20 oz/yd$^2$ (0.07 g/cm$^2$), and the total composite fabric thickness was 0.045 inch (1.14 mm). The composite had a grab strength in the range of 1700 to 1900 pounds per inch (298-333 kN/m) of fabric width, as measured by ASTM 1682.

A 114 inch wide by 120 inch high (289.6 to 304.8 cm) composite fabric was tested as a hurricane shutter according to ASTM E1886/1996 (equivalent to State of Florida Building Code Testing Application Standard TAS 201). These standards involve shooting a "large missile" (as in Example 1) at 50 ft/s (15.24 m/s) perpendicularly at the fabric. The composite shutter has grommets located at the top edge and bottom edge for mounting onto a wooden frame. The sides of the curtain were left open (not attached to the wooden frame). Two impacts were made—one at the exact center of the composite curtain; and the other at a corner, about 7 to 8 inches (17.8 to 20.3 cm) from the edges of the same curtain. The composite shutter passed both impacts without tear or crack in the fabric. The deflection due to impact was found to be less than 10 inch (25.4 cm). The same curtain (after 2 impacts) also passed a cyclic wind load test of ±60 pounds per square foot (2.87 kPa) (equivalent to a hurricane wind speed of 153 miles (244.8 kilometers) per hour) according to ASTM E1886/1996 (TAS 203).

The composite curtain was also subjected to the Static Air Pressure test (ASTM E330 & TAS 202) and found to have a deflection of less than 14.9 inches (37.8 cm) at 90 pound per square foot (4.31 kPa) wind pressure.

Example 4 (Comparative)

In comparison, a standard vinyl coated polyester fabric weighing 36.52 oz/yd$^2$ (0.124 g/cm$^2$) and having a thickness of 0.042 inch (1.1 mm) was subject to the same impact test as in Example 1. The fabric failed the test as the stud penetrated the fabric. The fabric had a deflection of more than 12.5 inches (31.75 cm) at ±60 pounds per square foot (2.87 kPa).

The vinyl coated polyester fabric was also subjected to the Taber abrasion test (ASTM D3389) and found to last only 20,550 cycles.

The percent transmitted light through this composite was found to be about 64%, based on the same test as in Example 1.

As can be seen, the above composite fabrics have better impact resistance than conventional fabric screening and are lighter in weight. They are capable of withstanding hurricane force winds and have significantly improved abrasion resistance compared to a much heavier vinyl coated polyester fabric. Accordingly, building openings can be protected against hurricane force winds with the fabrics described herein.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A building having at least one opening, said opening being protected from hurricane force winds and associated flying objects by a flexible composite fabric covering said opening, said flexible composite fabric comprising:
   (a) at least one layer of a woven fabric, said woven fabric being free of matrix resin, at least about 75% of the fibers of said fabric comprising high tenacity polyolefin fibers, said fabric having first and second surfaces; and
   (b) at least one layer of a substantially clear plastic film attached to a surface of said high tenacity polyolefin fiber fabric, said plastic film having first and second surfaces;
   said composite fabric having a weight of from about 2 to about 30 ounces per square yard (67.8 to 1017 g/m$^2$);
   each of said fabric layer and said film layer having sufficient translucency so as to permit at least about 60% of light to enter said opening of said building; said fabric layer providing protection against high wind and impact from projectiles, and said film layer providing an impervious barrier to water, whereby said opening is protected against hurricane force winds and associated flying objects.

2. The building of claim 1 wherein said flexible composite fabric further comprises an adhesive layer which bonds at least one of said, surfaces of said fabric layer to at least one of said surfaces of said film layer.

3. The building of claim 1 wherein said fabric layer is directed laminated to said film layer.

4. The building of claim 1 wherein the thickness of said composite fabric is from about 6 to about 60 mils (150 to 1500 μm).

5. The building of claim 2 wherein said film layer comprises low density polyethylene and said adhesive layer comprises ethylene vinyl acetate.

6. The building of claim 2 wherein said flexible composite fabric consists of at least one layer of said woven fabric, at least one layer of said plastic film, and at least one layer of said adhesive layer.

7. The building of claim 1 wherein said fibers comprise extended chain polyethylene fibers.

8. The building of claim 7 wherein said film layer comprises a film of a polyolefin or a fluoropolymer.

9. The building of claim 7 wherein said film layer comprises a polyethylene film.

10. The building of claim 7 wherein said film layer has a thickness of from about 0.1 to about 10 mils (2.5 to 25 μm).

11. The building of claim 7 wherein all of the fibers in said fabric are extended chain polyethylene fibers.

12. The building of claim 7 wherein said high tenacity fibers have a tenacity of at least about 25 grams per denier and an initial tensile modulus of at least about 1,000 g/d.

13. The building of claim 7 including two layers of said plastic film and two layers of said adhesive, said plastic film layers being bonded to both surfaces of said woven fabric by said adhesive layers.

14. The building of claim 13 wherein said adhesive layers comprise ethylene vinyl acetate and said film layers comprise low density polyethylene.

15. The building of claim 1 wherein said flexible composite fabric is adapted to be rolled up.

16. In a building having an opening, and a protective screening covering said opening, the improvement comprising said screening comprising a flexible composite fabric comprising:
   (a) at least one layer of a woven fabric, said woven fabric being free of matrix resin, at least about 75% of the fibers of said fabric comprising high tenacity polyolefin fibers, said fabric having first and second surfaces; and
   (b) at least one layer of a substantially clear plastic film attached to a surface of said high tenacity polyolefin fiber fabric, said plastic film having first and second surfaces;
   said composite fabric having a weight of from about 2 to about 30 ounces per square yard (67.8 to 1017 g/m$^2$);
   each of said fabric layer and said film layer having sufficient translucency so as to permit at least about 60% of light to enter said opening of said building; said fabric layer providing protection against high wind and impact from projectiles, and said film layer providing an impervious barrier to water, whereby said opening is protected against hurricane force winds and associated flying objects.

17. The building of claim 16 wherein said high tenacity polyolefin fibers comprise high tenacity polyethylene fibers.

18. A method of protecting a building opening from hurricane force winds and associated flying objects, said method comprising providing a screening for said building opening, said screening comprising a flexible composite fabric covering said opening, said flexible composite fabric comprising:
   (a) at least one layer of a woven fabric, said woven fabric being free of matrix resin at least about 75% of the fibers of said fabric comprising high tenacity polyolefin fibers, said fabric having first and second surfaces; and
   (b) at least one layer of a substantially clear plastic film attached to a surface of said high tenacity polyolefin fiber fabric, said plastic film having first and second surfaces;
   said composite fabric having a weight of from about 2 to about 30 ounces per square yard (67.8 to 1017 g/m$^2$);
   each of said fabric layer and said film layer having sufficient translucency so as to permit at least about 60% of light to enter said opening of said building; said fabric layer providing protection against high wind and impact from projectiles, and said film layer providing an impervious barrier to water.

19. The method of claim 18 wherein said high tenacity polyolefin fibers comprise high tenacity polyethylene fibers.

20. The method of claim 19 further comprising an adhesive layer which bonds at least one of said surfaces of said fabric layer to at least one of said surfaces of said plastic film layer.

21. A lightweight storm curtain for covering at least one opening in a building structure, such as windows, doors, sliding glass doors and the like, and for protecting said opening from hurricane force winds and associated flying objects, said storm curtain comprising:

(a) a flexible composite fabric comprising:
  at least one base layer of a woven fabric having first and second surfaces, said woven fabric being free of matrix resin, said fabric formed of yarns at least about 75% of which comprise high tenacity polyolefin fibers, said yarns having a denier in the range from about 50 to about 5000;
  (ii) at least one waterproofing layer of a substantially clear plastic film, said plastic film having first and second surfaces;
  (iii) the total weight of said composite fabric being in the range of from about 2 to about 30 oz/yd$^2$ (67.8 to 1017 g/m$^2$), and the total thickness of said composite fabric being in the range of from about 6 to about 60 mils (150 to 1500 µm); and
(b) a retainer releaseably connecting said composite fabric to said building structure in such a manner as to cover said opening;
said composite fabric layer having sufficient translucency so as to permit at least about 60% of light to enter said opening of said building structure, providing protection against high wind and impact from projectiles, and providing a barrier to water.

22. The lightweight storm curtain of claim 21 wherein said plastic film comprises a polyethylene film.

23. The lightweight storm curtain of claim 21 further comprising at least one adhesive layer bonding one of said surfaces of said base layer to one of said surfaces of said plastic film.

24. The lightweight storm curtain of claim 23 wherein said adhesive comprises ethylene vinyl acetate.

25. The lightweight storm curtain of claim 24 wherein said composite fabric has a total weight in the range of from about 5 to about 25 oz/yd$^2$ (169.5 to 847.5 g/m$^2$) and a total thickness in the range of from about 10 to about 50 mils (250 to 1250 µm).

26. The lightweight storm curtain of claim 25 wherein said composite fabric layer has sufficient translucency so as to permit at least about 75% of light to enter said opening of said building structure.

27. The lightweight storm curtain of claim 23 including two layers of said plastic film and two layers of said adhesive, said plastic film layers being bonded to both surfaces of said base layer by said adhesive layers.

28. The lightweight storm curtain of claim 21 wherein said high tenacity polyolefin fibers comprise extended chain polyethylene fibers.

29. A lightweight storm curtain for covering at least one opening in a building structure, such as windows, doors, sliding glass doors and the like, and for protecting said opening from hurricane force winds and associated flying objects, said storm curtain comprising:
  (a) a flexible composite fabric comprising:
    (i) a base layer of a woven fabric having first and second surfaces, said woven fabric being free of matrix resin, said woven fabric formed of yarns at least about 75% of which comprise extended chain polyethylene fibers, said yarns having a denier in the range from about 200 to about 5000;
    (ii) a waterproofing layer of a substantially clear polyethylene film, said polyethylene film having first and second surfaces;
    (iii) an ethylene vinyl acetate adhesive layer bonding one of said surfaces of said base layer to one of said surfaces of said polyethylene film;
    (iv) the total weight of said composite fabric being in the range of from about 2 to about 30 oz/yd$^2$ (67.8 to 1017 g/m$^2$), and the total thickness of said composite fabric being in the range of from about 6 to about 60 mils (150 to 1500 µm); and
  (b) a retainer releaseably connecting said composite fabric to said building structure in such a manner as to cover said opening;
  said composite fabric layer having sufficient translucency so as to permit at least about 75% of light to enter said opening of said building structure, providing protection against high wind and impact from projectiles, and providing a barrier to water.

30. The storm curtain of claim 29 wherein said yarns have a denier in the range of from about 650 to about 3000.

31. The lightweight storm curtain of claim 30 wherein said composite fabric has a total weight in the range of from about 5 to about 25 oz/yd$^2$ (169.5 to 847.5 g/m$^2$) and a total thickness in the range of from about 10 to about 50 mils (250 to 1250 µm).

32. The lightweight storm curtain of claim 29 including two layers of said polyethylene film, each of which is bonded to opposite surfaces of said base layer by a layer of said ethylene vinyl acetate adhesive.

33. The lightweight storm curtain of claim 31 wherein said storm curtain passes the hurricane curtain test of ASTM E1886/1996 and also passes the cyclic wind load test of at least ±60 pounds per square foot (2.87 kPa) (equivalent to a hurricane wind speed of 153 miles (244.8 kilometers) per hour) according to ASTM E1886/1996.

\* \* \* \* \*